US009460486B2

(12) United States Patent
Ohba et al.

(10) Patent No.: US 9,460,486 B2
(45) Date of Patent: Oct. 4, 2016

(54) IMAGE DISPLAY SYSTEM, INFORMATION PROCESSING DEVICE, SERVER, AND IMAGE PROCESSING METHOD

(75) Inventors: Akio Ohba, Kanagawa (JP); Hiroyuki Segawa, Kanagawa (JP); Tetsugo Inada, Kanagawa (JP)

(73) Assignees: Sony Corporation, Tokyo (JP); Sony Interactive Entertainment Inc., Tokyo (JP)

( * ) Notice: Subject to any disclaimer, the term of this patent is extended or adjusted under 35 U.S.C. 154(b) by 377 days.

(21) Appl. No.: 14/128,027

(22) PCT Filed: May 22, 2012

(86) PCT No.: PCT/JP2012/003345
§ 371 (c)(1),
(2), (4) Date: Mar. 26, 2014

(87) PCT Pub. No.: WO2013/005367
PCT Pub. Date: Jan. 10, 2013

(65) Prior Publication Data
US 2014/0247285 A1 Sep. 4, 2014

(30) Foreign Application Priority Data
Jul. 4, 2011 (JP) .................. 2011-148649

(51) Int. Cl.
*G06T 3/40* (2006.01)
*G06T 11/00* (2006.01)
(Continued)

(52) U.S. Cl.
CPC .......... *G06T 3/40* (2013.01); *G06T 11/00* (2013.01); *G06T 11/20* (2013.01); *H04N 21/234327* (2013.01); *H04N 21/234345* (2013.01); *H04N 21/2662* (2013.01); *H04N 21/45455* (2013.01);

(Continued)

(58) Field of Classification Search
None
See application file for complete search history.

(56) References Cited

U.S. PATENT DOCUMENTS 6,563,999 B1  5/2003  Suzuoki
9,250,704 B2  2/2016  Shinohara
(Continued)

FOREIGN PATENT DOCUMENTS

CN  101086829 A  12/2007
JP  10326464 A  12/1998
(Continued)

OTHER PUBLICATIONS

International Search Report for corresponding PCT Application No. PCT/2012/003345, dated Jul. 10, 2012.
(Continued)

*Primary Examiner* — Sultana M Zalalee
(74) *Attorney, Agent, or Firm* — Matthew B. Dernier, Esq

(57) ABSTRACT

Links are set among three hierarchical data and one moving image data. When a display area overlaps with a first link area while an image is being displayed by using first hierarchical data, switching to display by use of the 0-th hierarchical level of the second hierarchical data is made. When the display area overlaps with a second link area while an image is being displayed by using the second hierarchical data, switching to display by use of the 0-th hierarchical level of the third hierarchical data is made. The link destination of another link area is the moving image data and moving image reproduction is started as a result of zoom-up of this area. The hierarchical data are held on the client terminal side and the data existing on the other side of a switching boundary are transmitted to the client terminal in a data stream format.

15 Claims, 12 Drawing Sheets

(51) Int. Cl.
  *H04N 21/2343*  (2011.01)
  *H04N 21/2662*  (2011.01)
  *H04N 21/4545*  (2011.01)
  *H04N 21/4728*  (2011.01)
  *G06T 11/20*    (2006.01)
  *H04N 21/81*    (2011.01)

(52) U.S. Cl.
  CPC ........ *H04N 21/4728* (2013.01); *H04N 21/816* (2013.01); *G06T 2200/16* (2013.01); *G06T 2210/08* (2013.01); *G06T 2210/36* (2013.01)

(56) References Cited

U.S. PATENT DOCUMENTS

| | | |
|---|---|---|
| 2009/0265661 A1 | 10/2009 | Shuster |
| 2010/0115462 A1* | 5/2010 | Spencer .................... G06F 3/14 715/800 |
| 2011/0063500 A1 | 3/2011 | Loher |
| 2012/0056903 A1 | 3/2012 | Shinohara |

FOREIGN PATENT DOCUMENTS

| | | | | |
|---|---|---|---|---|
| JP | 2005301058 A | | 10/2005 | |
| JP | 2007156758 A | * | 6/2007 | |
| JP | 2007264867 A | * | 10/2007 | |
| JP | WO 2010055604 A1 | * | 5/2010 | ........... G06F 3/0481 |
| WO | 20100109570 A1 | | 9/2010 | |

OTHER PUBLICATIONS

International Preliminary report on Patentability and Written Opinion for corresponding PCT Application No. PCT/JP2012/003345, dated Jan. 16, 2014.

Office Action for corresponding CN Application No. 201280032031.4, 11 Pages, dated Feb. 24, 2016.

European Search Report for corresponding EP Application No. 12806881, 7 Pages, dated Apr. 15, 2016.

* cited by examiner

FIG. 9

| 302 | 304 | 306 | 308 |
|---|---|---|---|
| 0.0, 0.0, 2.0, 0.0, | 98.0, | parent_0, | -0.1, 0.2, 0.08, 0.0 |
| 0.16,-0.11, 0.01, 0.0, | -1.0, | child_0, | 0.0, 0.0, 1.0, 0.0 |
| 0.10,-0.14, 0.01, 0.0, | -1.0, | AAA.mp4, | 0.0, 0.0, 1.0, 0.0 |
| 0.07,-0.15, 0.01, 0.0, | -1.0, | /server1/aaa/, | 0.0, 0.0, 1.0, 0.0 |
| ... | | | |

| 302 | 304 | 306 | 308 |
|---|---|---|---|
| 0.0, 0.0, 2.0, 0.0, | 98.0, | /client1/parent_0, | -0.1, 0.2, 0.08, 0.0 |
| 0.16,-0.11, 0.01, 0.0, | -1.0, | /client1/child_0, | 0.0, 0.0, 1.0, 0.0 |
| 0.10,-0.14, 0.01, 0.0, | -1.0, | /client1/AAA.mp4, | 0.0, 0.0, 1.0, 0.0 |
| 0.07,-0.15, 0.01, 0.0, | -1.0, | BBB.mp4, | 0.0, 0.0, 1.0, 0.0 |

22b

IMAGE DISPLAY SYSTEM, INFORMATION PROCESSING DEVICE, SERVER, AND IMAGE PROCESSING METHOD

TECHNICAL FIELD

The present invention relates to an image processing technique to scale up/down or vertically and horizontally move an image displayed on a display.

BACKGROUND ART

A home-use entertainment system that does not only run a game program but can reproduce a moving image has been proposed. In this home-use entertainment system, a GPU generates a three-dimensional image using polygons (refer to e.g. Patent Literature 1).

CITATION LIST

Patent Literature

[PTL 1]
U.S. Pat. No. 6,563,999 A

SUMMARY

Technical Problems

To display various images in a terminal operated by the user irrespective of whether the image is a still image or a moving image, it is necessary to ensure sufficient resources such as a storage device for storing data of a requested image. Furthermore, in a mode in which an image is displayed with movement of the display area based on instruction input of the user, it is desirable that sufficient responsiveness to the instruction input is obtained even with a high-definition image. Meanwhile, the optimum display environment the user thinks is diversified depending on the performance possessed by the terminal and the purpose of image display. In the modern environments enabling acquisition of a huge number of pieces of content via networks, a technique allowing free selection of the combination of plural factors such as content, quality, responsiveness, and charging system is desired.

The present invention is made in view of such problems and an object thereof is to provide a technique enabling display of a variety of images in an environment meeting the request of a user.

Solution to Problems

A mode of the present invention relates to an image display system. This image display system is an image display system including a client terminal that performs display and moves a display area in an image being displayed according to a request signal of display area movement, and a server that connects to the client terminal via a network and transmits image data to the client terminal. The client terminal includes a first storage that stores image data of at least a partial image, an area parameter decider that decides an area parameter representing the position and size of the display area in the image being displayed according to the request signal of display area movement, and a display image processor that draws an image of the display area by using image data that is defined by the area parameter and is necessary for display and outputs the image to a display device if the image data necessary for display is stored in the first storage. The client terminal further includes an operation information transmitter that sequentially transmits information relating to movement of the display area to the server, and a data reproducer that reproduces data of an image transmitted from the server and outputs the data to the display device if the image data necessary for display is not stored in the first storage. The server includes a second storage that stores at least image data that is not stored in the first storage, and a data transmitter that transmits, to the client terminal, data of an image of the display area drawn by using image data stored in the second storage based on the information relating to movement of the display area transmitted from the operation information transmitter.

Another mode of the present invention relates to an information processing device. This information processing device is an information processing device that performs display and moves a display area in an image being displayed according to a request signal of display area movement. The information processing device includes a storage that stores image data of at least a partial image, an area parameter decider that decides an area parameter representing the position and size of the display area in the image being displayed according to the request signal of display area movement, and a display image processor that draws an image of the display area by using image data that is defined by the area parameter and is necessary for display and outputs the image to a display device if the image data necessary for display is stored in the storage. The information processing device further includes an operation information transmitter that sequentially transmits information relating to movement of the display area to a server connected via a network, and a data reproducer that reproduces data of the image of the display area drawn based on the information relating to movement of the display area to be transmitted by the server and outputs the data to the display device if the image data necessary for display is not stored in the storage.

Further mode of the present invention relates to a server. This server includes an operation information receiver that acquires information relating to movement of a display area from a client terminal that is connected via a network and performs display and moves the display area in an image being displayed according to a request signal of display area movement, a storage that stores at least image data that is not stored in a storage device of the client terminal, and a data transmitter that transmits, to the client terminal, data of an image of the display area drawn by using image data stored in the storage if image data that is defined by the information relating to movement of the display area and is necessary for display is not stored in the storage device of the client terminal.

Even further mode of the present invention relates to an image processing method. This image processing method is an image processing method to perform display and move a display area in an image being displayed according to a request signal of display area movement in an information processing device. The image processing method includes a step of deciding an area parameter representing the position and size of the display area in the image being displayed according to the request signal of display area movement, and a step of drawing an image of the display area by using image data that is defined by the area parameter and is necessary for display and outputting the image to a display device if the image data necessary for display is stored in a storage of the information processing device. The image processing method further includes a step of sequentially transmitting information relating to movement of the display area to a server connected to the information processing device via a network, and a step of reproducing data of the image of the display area drawn based on the information relating to movement of the display area to be transmitted by the server and outputting the data to the display device if the image data necessary for display is not stored in the storage of the information processing device.

What are obtained by translating arbitrary combinations of the above-described constituent elements and expressions of the present invention among method, device, system, computer program, and so forth are also effective as modes of the present invention.

Advantageous Effect of Invention

According to the present invention, a variety of images can be displayed with quality and responsiveness meeting the request of a user.

BRIEF DESCRIPTION OF DRAWINGS

FIG. 9 is a diagram showing a data structure example of a link setting file held by the client terminal in the present embodiment.

FIG. 10 is a diagram showing a data structure example of the link setting file held by the server in the present embodiment.

DESCRIPTION OF EMBODIMENTS

Figure 1:
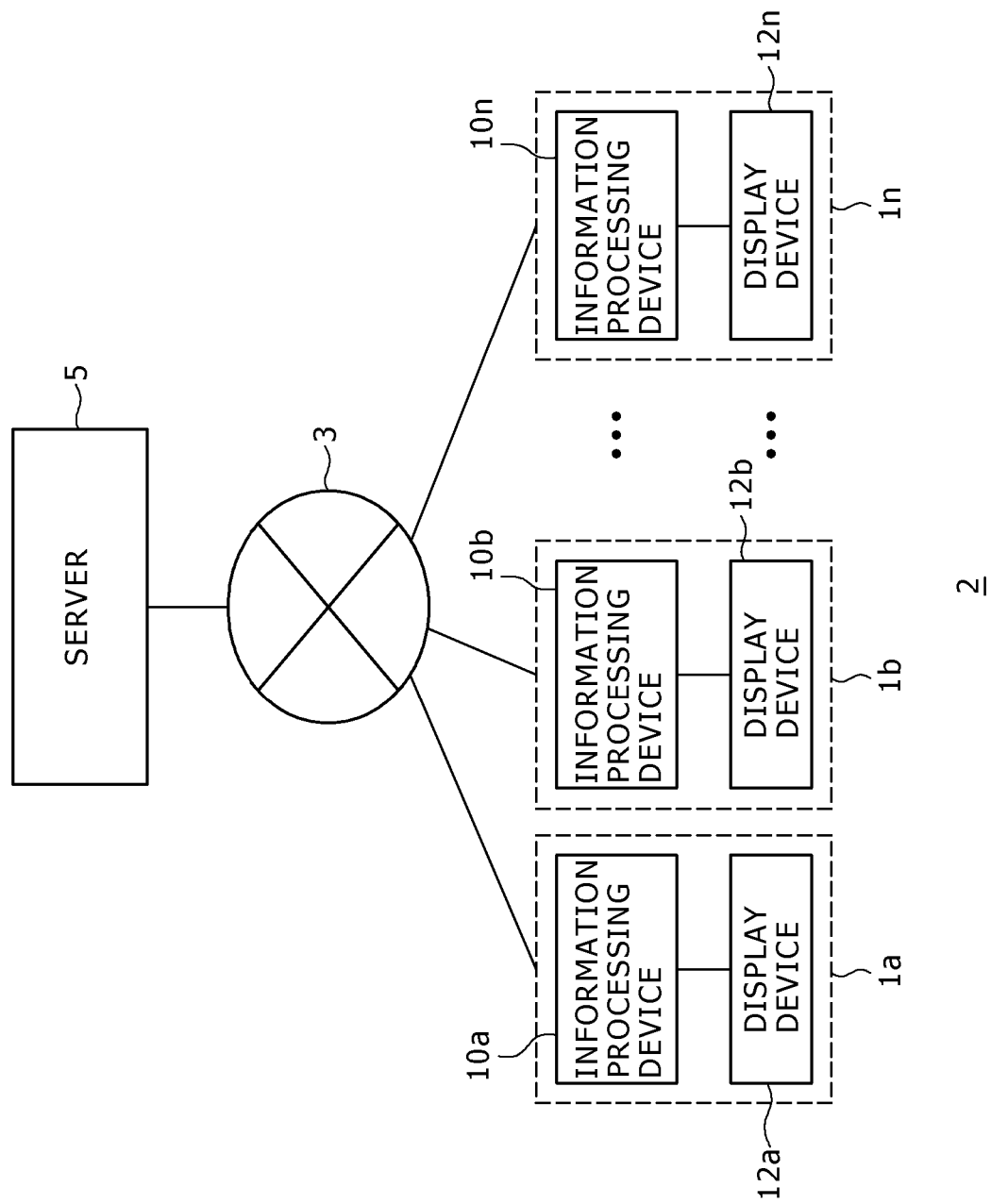
FIG. 1 is a diagram showing the configuration of an image display system in the present embodiment.

FIG. 1 shows the configuration of an image display system in the present embodiment. As shown in this diagram, in an image display system 2, client terminals 1a, 1b, . . . , 1n are each so configured as to be connectable to a network 3 and perform data transmission and reception with a server 5. The client terminals 1a, 1b, . . . , 1n perform image display by using image data held by themselves and also perform image display by using image data transmitted from the server 5. As described later, in the present embodiment, the reading source of the image data is seamlessly switched based on a display area movement request by a user. The client terminals 1a, 1b, . . . , 1n connect to the network 3 in a wired or wireless manner. A general technique can be applied to the procedure relating to establishment of the communication with the server 5.

The client terminals 1a, 1b, . . . , 1n include information processing devices 10a, 10b, . . . , 10n that execute data transmission and reception with the server 5 and image processing, and display devices 12a, 12b, . . . , 12n that output the result of the image processing by the information processing devices 10a, 10b, . . . , 10n. The display devices 12a, 12b, . . . , 12n may be a television having a display to output images and a speaker to output sounds. Hereinafter, the respective symbols will be collectively represented, so that the client terminal 1, the information processing device 10, and the display device 12 will be employed. The display device 12 may be connected to the information processing device 10 by a wired cable or may be wirelessly connected by a wireless LAN (Local Area Network) or the like.

Figure 2:
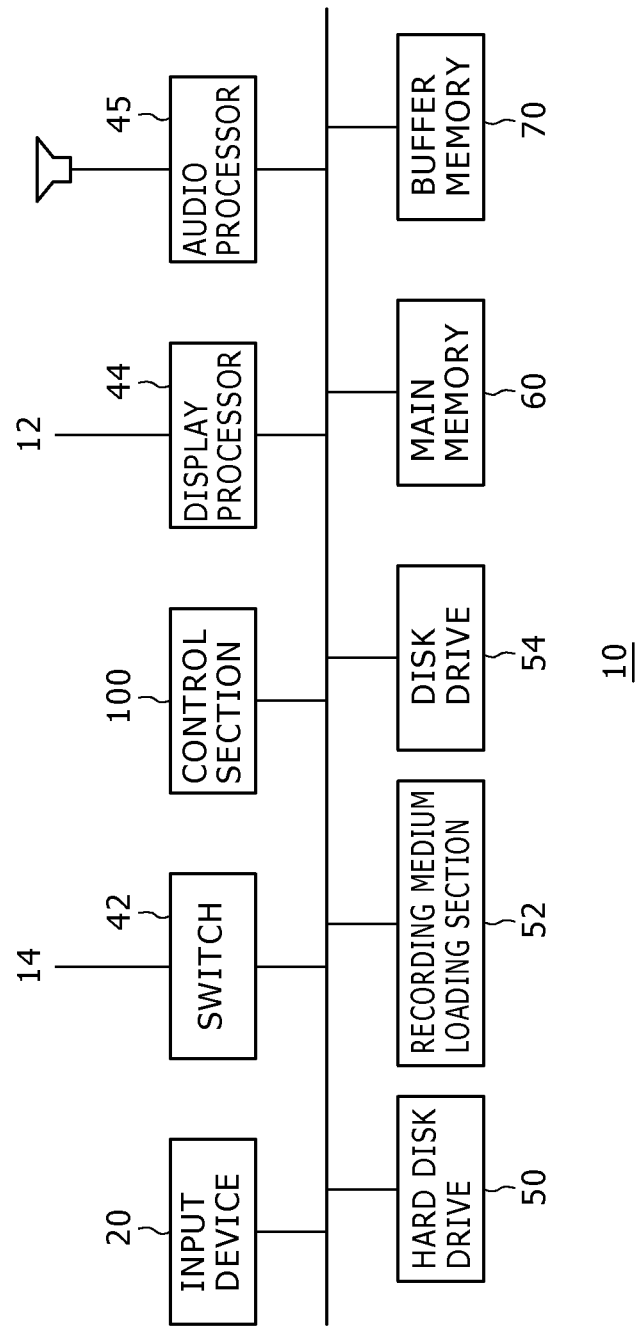
FIG. 2 is a diagram showing the configuration of an information processing device in the present embodiment.

FIG. 2 shows the configuration of the information processing device 10. The information processing device 10 is so configured as to have an input device 20, a switch 42, a display processor 44, an audio processor 45, a hard disk drive 50, a recording medium loading section 52, a disk drive 54, a main memory 60, a buffer memory 70, and a control section 100. The display processor 44 has a frame memory to buffer data to be displayed on the display of the display device 12.

The input device 20 accepts a request made by the user with viewing of a screen displayed on the display device 12, specifically e.g. a request to move a cursor or select a file or a command, and a request for scrolling and scaling-up/down of the screen, and transmits it to the control section 100 as a signal. The input device 20 can be realized by general input devices such as pointing device, mouse, keyboard, touch panel, game controller, and button. The input device 20 and the control section 100 may establish a wireless connection by using the Bluetooth (registered trademark) protocol or the IEEE 802.11 protocol. Alternatively, they may be connected via a cable.

The switch 42 is an Ethernet switch (Ethernet is registered trademark) and is a device that connects to external apparatus in a wired or wireless manner and performs data transmission and reception. The switch 42 is so configured that it connects to the external network 3 via a cable 14 and can receive image data and so forth from the server 5.

The hard disk drive 50 functions as a storage device that stores data. When a removable recording medium such as a memory card is loaded in the recording medium loading section 52, the recording medium loading section 52 reads out data from the removable recording medium. When a ROM disk exclusively for reading is loaded in the disk drive 54, the disk drive 54 drives and recognizes the ROM disk to read out data. The ROM disk may be an optical disk, a magneto-optical disk, etc. Image data to be displayed on the display device 12 and programs and various kinds of data necessary to execute the respective kinds of processing may be stored in the hard disk drive 50, the removable recording medium, the ROM disk, and so forth.

The control section 100 includes a multi-core CPU and has one general-purpose processor core and plural simple processor cores in one CPU. The general-purpose processor core is called a PPU (PowerPC Processor Unit) and the remaining processor cores are called a SPU (Synergistic Processor Unit).

The control section 100 includes a memory controller that connects to the main memory 60 and the buffer memory 70. The PPU has a register and includes a main processor as a main entity to carry out arithmetic operation. It efficiently assigns, to each SPU, a task as the basic processing unit in an application to be carried out. The PPU itself may carry out the task. The SPU has a register and includes a sub-processor as a main entity to carry out arithmetic operation and a local memory as a local storage area. The local memory may be used as the buffer memory 70.

The main memory 60 and the buffer memory 70 are storage devices and are configured as a RAM (random access memory). The SPU has a dedicated DMA (Direct Memory Access) controller as a control unit and can perform data transfer between the main memory 60 and the buffer memory 70 at high speed. Furthermore, it can realize high-speed data transfer between the frame memory in the display processor 44 and the buffer memory 70. The control section 100 of the present embodiment realizes a high-speed image processing function by operating the plural SPUs in parallel. The display processor 44 is connected to the display device 12 and outputs image data according to a request from the user. The audio processor 45 outputs an audio signal reproduced by the control section 100 to the speaker.

Figure 3:
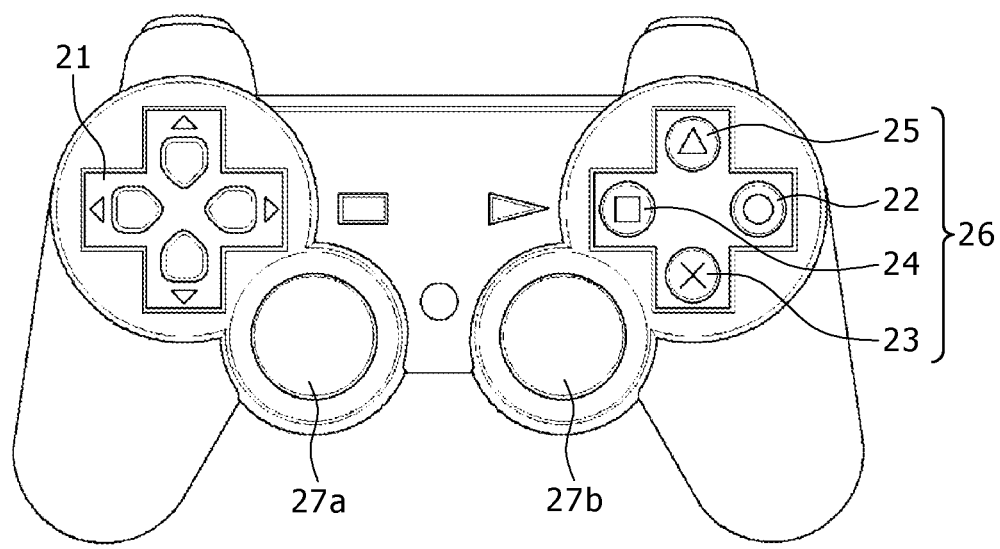
FIG. 3 is a diagram showing an appearance configuration example of an input device in the present embodiment.

FIG. 3 shows an appearance configuration example of the input device 20. The input device 20 includes a cross key 21, analog sticks 27a and 27b, and four kinds of operation buttons 26 as operation means operable by the user. The four kinds of operation buttons 26 are composed of a ○ button 22, a × button 23, a □ button 24, and a Δ button 25.

In the information processing device 10, to the operation means of the input device 20, functions for inputting a request to scale up/down a display image and a request for scroll the display image in the vertical and horizontal directions are assigned. For example, the input function of the request to scale up/down a display image is assigned to the right analog stick 27b. The user can input a request to scale down a display image by pulling the analog stick 27b to the user side, and can input a request to scale up a display image by pushing it from the user side.

Furthermore, the input function of the request for scrolling in the vertical and horizontal directions is assigned to the cross key 21. The user presses down the cross key 21 and thereby can input a request for movement in the direction of the pressed cross key 21. The input functions of these requests may be assigned to different operation means. For example, the input function of the scrolling request may be assigned to the analog stick 27a. Hereinafter, scaling-up/down of a display image and scrolling thereof in the vertical and horizontal directions will be often referred to as "movement of the display area" collectively.

In the present embodiment, plural image data are prepared as display targets and the user moves the display area, which enables the display image to be switched among the image data. Specifically, when the display area enters a preset area while a certain image is being displayed, the image data used for display is switched. The images before and after the switching may be data representing the same object in different resolution ranges or may be data representing completely-different objects.

Furthermore, the image may be either a still image or a moving image. In order to realize such a mode, data in which an area for switching to another image data and image data of the switching destination are set is prepared in addition to data of the image itself. Hereinafter, such association among plural image data will be referred to as a "link." Switching image data based on a link will be referred to as "execution of a link." An area on an image serving as a trigger of execution of a link will be referred to as a "link area."

Figure 4:
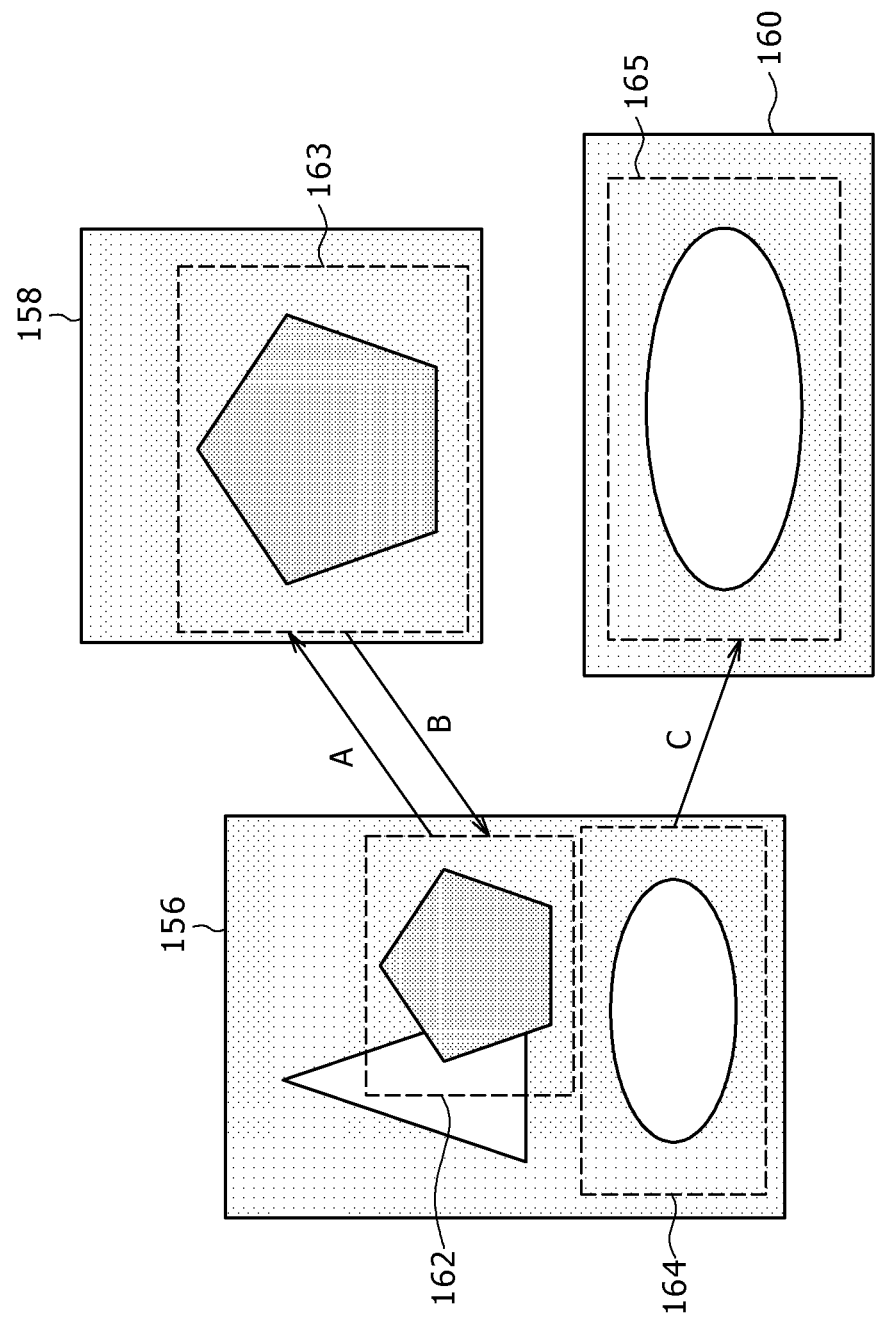
FIG. 4 is a diagram schematically showing the relationship among plural images as display targets in a mode in which links are introduced in the present embodiment.

FIG. 4 schematically shows the relationship among plural images serving as display targets in such a mode. In this diagram, three images, i.e. images 156, 158, and 160 are employed as the display targets. Furthermore, it is assumed that a link is set between a link area 162 of the image 156 and a link area 163 of the image 158 and a link is set between a link area 164 of the image 156 and a link area 165 of the image 160. When the display area overlaps with the link area 162 based on a movement request of the user while the display image is being generated by using image data of the image 156, the image data used for display is switched from the image 156 to the image 158 and the link area 163 in the image 158 is displayed (arrow A).

In the example of FIG. 4, an image mainly representing, with a high resolution, an area centered at the pentagon in the image 156 is stored in the hard disk drive 50 as data of another image 158. Furthermore, the link area 162 and the link area 163 are so set as to have the same angle of view. This allows an image with a resolution higher than that of the image 156 to be continuously displayed by using the data of the image 158. At this time, in appearance, the image data is switched through only zoom-in to the pentagon. Thus, the user is not aware of that such switching is performed.

Furthermore, between the link area 162 and the link area 163, an arrow B, i.e. a link in the opposite direction to the arrow A, is also set as shown in the diagram. In this case, after transition of the arrow A, when the user who has displayed a desired area in the image 158 returns the display area and this display area overlaps with the link area 163 again, the data used for display is switched from the image 158 to the image 156 and the link area 162 in the image 156 is displayed (arrow B). Also in this case, through only the return of the display area in the image 158, continuous switching is allowed without awareness of the switching of the image data.

Also in transition from the link area 164 to the link area 165 (arrow C), similarly, when the display image overlaps with the link area 164 through zoom-in to the ellipse while the image 156 is being displayed, the image data is switched and the link area 165 of the image 160 is displayed. This allows display of an image with a resolution higher than that of the image 156. Here, in the state in which two areas "overlap," the boundaries of the areas do not need to strictly overlap. It is enough that the display area exists in a set range in the resolution direction or on the image plane as described later.

To effectively dramatize such a link between image data, it will be possible that the image data is given a hierarchical structure composed of plural data representing one image with different resolutions. Furthermore, in scaling-up/down processing of an image based on instruction input of the user, the hierarchical level of the data used for drawing is switched depending on the resolution. This dramatically increases the width of the resolution that can be represented by using image data of one unit. Therefore, the flexibility in setting of the link area increases, and content and service using images can be diversified. Hereinafter, image data having such a hierarchical structure will be referred to as "hierarchical data."

Figure 5:
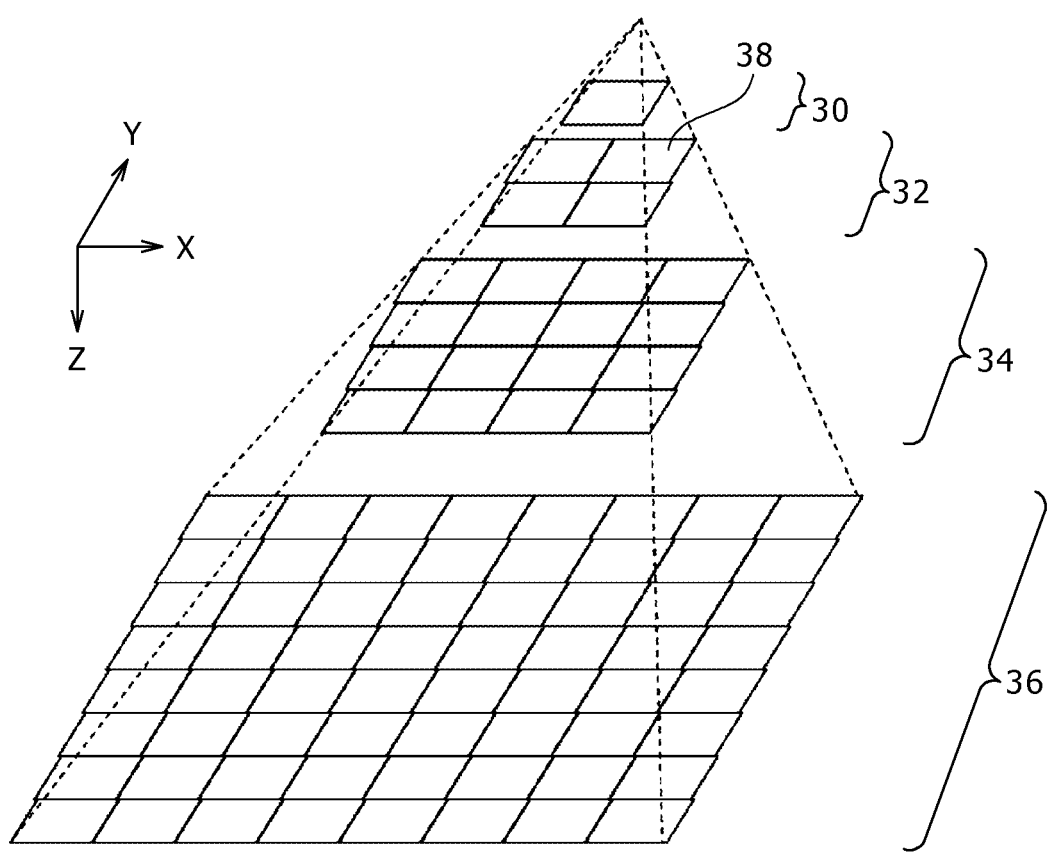
FIG. 5 is a conceptual diagram of hierarchical data as a processing target in the present embodiment.

FIG. 5 is a conceptual diagram of the hierarchical data. The hierarchical data has a hierarchical structure composed of a 0-th hierarchical level 30, a first hierarchical level 32, a second hierarchical level 34, and a third hierarchical level 36 in the depth (Z-axis) direction. Although only four hierarchical levels are shown in this diagram, the number of hierarchical levels is not limited thereto.

The hierarchical data shown in FIG. 5 has a quad-tree hierarchical structure and each hierarchical level is formed of one or more tile images 38. All tile images 38 are formed into the same size with the same number of pixels and have e.g. 256×256 pixels. The image data of the respective hierarchical levels represent one image with different resolutions, and the resolution becomes lower in order of the third hierarchical level 36, the second hierarchical level 34, the first hierarchical level 32, and the 0-th hierarchical level 30. For example, the resolution of the N-th hierarchical level (N is an integer equal to or larger than 0) may be ½ of the resolution of the (N+1)-th hierarchical level in both the horizontal (X-axis) direction and the vertical (Y-axis) direction.

The hierarchical data is stored in the hard disk drive 50 in a state of being compressed in a predetermined compression format and is read out from the hard disk drive 50 to be decoded before being displayed on the display device 12. Here, the compression format is not limited and may be any of S3TC format, JPEG format, and JPEG 2000 format for example.

For the hierarchical structure of the hierarchical data, the horizontal direction, the vertical direction, and the depth direction are set as the X-axis, the Y-axis, and the Z-axis, respectively, as shown in FIG. 5 and a virtual three-dimensional space is constructed. When deriving the change amount of the frame from an instruction input signal of scrolling and scaling-up/down of the screen, supplied from the input device 20, the information processing device 10 derives the coordinates of the four corners of the frame (frame coordinates) in the virtual space by using the change amount.

The frame coordinates in the virtual space are utilized for loading of compressed data into the main memory and frame drawing processing, which will be described later. For example, for change in the resolution of a display image, switching boundaries are set between the respective hierarchical levels on the Z-axis. Furthermore, when the Z-coordinate of the frame goes over this switching boundary based on a request signal of display area movement, the hierarchical level used for drawing of the display image is switched. Then, loading and decoding are performed according to need and the display image is generated by performing scaling-up/down in accordance with the requested resolution.

The information processing device 10 may derive information to identify the hierarchical level and texture coordinates (UV coordinates) at this hierarchical level instead of the frame coordinates in the virtual space. Hereinafter, the combination of the information to identify the hierarchical level and the texture coordinates will also be referred to as frame coordinates. Moreover, if the image of the processing target is not given the hierarchical structure, frame coordinates may be represented in the two-dimensional space of the image plane. Alternatively, instead of frame coordinates, another parameter by which the position and size of the frame, i.e. the display area, are determined may be introduced. For example, the parameter may be the position of the viewpoint to the image, the centroid coordinates of the frame and the size of the side thereof, the relative position from the reference frame and the relative size, etc.

Furthermore, the frame coordinates are utilized also when it is determined whether or not to execute a link by an inside/outside determination with a set link area. Moreover, the frame coordinates are utilized also when the main entity that determines whether or not to execute a link is switched between the client terminal 1 and the server 5 by an inside/outside determination with a switching area set near a link area.

In order to smoothly update display in executing scaling-up/down processing of the screen or scrolling processing, the information processing device 10 loads part of hierarchical data from the hard disk drive 50 to the main memory 60. Furthermore, based on the previous movement direction of the display area, the information processing device 10 may anticipate an area that will be displayed in the future and decode further part of the image data loaded to the main memory 60 to store the decoded data to the buffer memory 70. This makes it possible to instantaneously switch the image data used for drawing of the display area at the later necessary timing.

Figure 6:
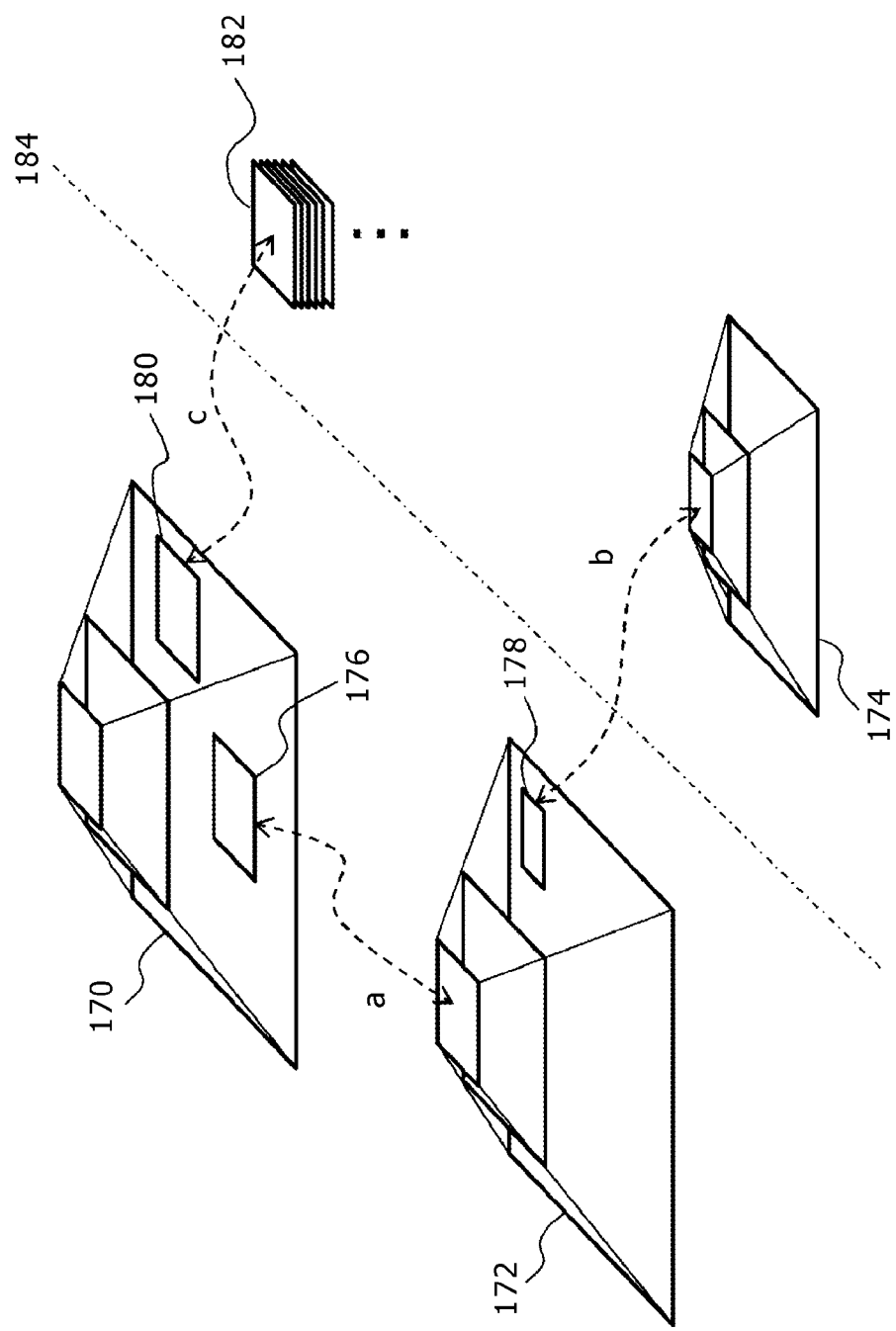
FIG. 6 is a diagram schematically showing a state in which links are set among plural image data including hierarchical data in the present embodiment.

FIG. 6 schematically shows a state in which links are set among plural image data including hierarchical data. In the example of this diagram, the links are set among three hierarchical data 170, 172, and 174 and one moving image data 182 and correspondence between link areas is shown by a dotted arrow. For example, when the display area overlaps with a link area 176 set at the second hierarchical level while an image is being displayed by using the hierarchical data 170, switching to display by use of the 0-th hierarchical level of the hierarchical data 172 is made (link a). In this case, the link area of the link destination is the whole image of the 0-th hierarchical level of the hierarchical data 172.

Due to such setting, when zoom-in of the vicinity of the link area 176 is performed in image display by use of the hierarchical data 170, first the data used for image drawing is switched to the 0-th hierarchical level, the first hierarchical level, and the second hierarchical level of the hierarchical data 170 and furthermore the hierarchical data itself is switched to the hierarchical data 172. Thus, an object in the link area 176 can be further scaled up.

Conversely, when zoom-out is performed to the resolution of the 0-th hierarchical level while an image is being displayed by using the hierarchical data 172, the image is returned to the link area 176 of the hierarchical data 170. Similarly, when the display area overlaps with a link area 178 set at the second hierarchical level while an image is being displayed by using the hierarchical data 172, switching to display by use of the 0-th hierarchical level of the hierarchical data 174 is made (link b). Thereafter, when zoom-out is performed to the resolution of the 0-th hierarchical level of the hierarchical data 174, the image is returned to the link area 178 of the hierarchical data 172.

As described above, the target object represented by these hierarchical data may be the same object or may be a completely-different object. In the latter case, such rendition that a different image world is developed simultaneously with switching of image data can be realized. Meanwhile, another link area 180 is set in the hierarchical data 170 and the link destination thereof is set to the moving image data 182 (link c). For example, it is possible to bury a title image of this moving image in the link area 180 as the link source and start reproduction of the moving image when zoom-up of this area is performed.

The link destination is not limited to hierarchical data and moving image and may be still image data having no hierarchical structure, plural still image data sequentially displayed by a slide show, audio data, etc. If the link destination is set to moving image data or audio data, the display image may be returned to the image of the link source when the user stops reproduction or reproduction is completed. If the link destination is data of a type other than that of image data processed thus far, such as moving image data or audio data, in addition to switching of the data of the processing target, a function for reproduction and processing of the relevant data is arbitrarily activated.

As above, in the present embodiment, irrespective of whether or not data is hierarchical data and irrespective of whether data is still image data, moving image data, or audio data, execution of various pieces of content triggered by the movement of the display area is realized by connecting plural electronic data by links with the initial image displayed first defined as the origin. The information necessary to set a link is basically a set of information representing the area of the link source, information relating to data of the link destination, and information representing the area of the link destination when this link destination is an image. Hereinafter, a file in which such setting is described will be referred to as a "link setting file." A specific example of the link setting file will be shown later.

By variedly connecting individual electronic data by utilizing such a mechanism, a network including the respective data as nodes can be infinitely developed. However, with the limited storage area in the client terminal 1, the amount of data that can be stored is limited. Meanwhile, in the case of distributing data via the network 3, the output performance such as responsiveness easily changes depending on the network environments, the resources possessed by the client terminal, the data size, and so forth.

In the present embodiment, a mode is employed in which the client terminal 1 holds part of plural data among which links are set and the server 5 performs data distribution according to need in association with the movement of the display area in the client terminal 1. Due to this, under unified operability, with expansion of the accessible range on the data network, distinction of data is clarified based on whether or not the data is held in the client terminal 1. This makes quality management and charging control easy.

For example, the hierarchical data 170 and 172 in the data network shown in FIG. 6 are stored in the hard disk drive 50 of the client terminal 1. Furthermore, in execution of the link b or the link c, whose link destination is data not held by the client terminal 1, the client terminal 1 switches the data reading source from its own hard disk drive 50 to the server 5. In FIG. 6, a one-dot chain line 184 represents the switching boundary thereof. The data existing on the other side of the switching boundary are transmitted by the server 5 to the client terminal 1 in a data stream format and the client terminal 1 sequentially reproduces and outputs the transmitted stream.

In the client terminal 1 and the server 5, a similar link setting file is held regarding the same image data. This enables the side of the server 5 to trace the movement of the display area and execution of a link in the client terminal 1. However, to clarify the reading source of data of the link destination, the format of information relating to the data of the link destination in the link setting file is changed depending on the reading source of the data and whether the client terminal 1 or the server 5 holds this link setting file. This information is adaptively changed according to the data acquisition status in the client terminal 1.

Figure 7:
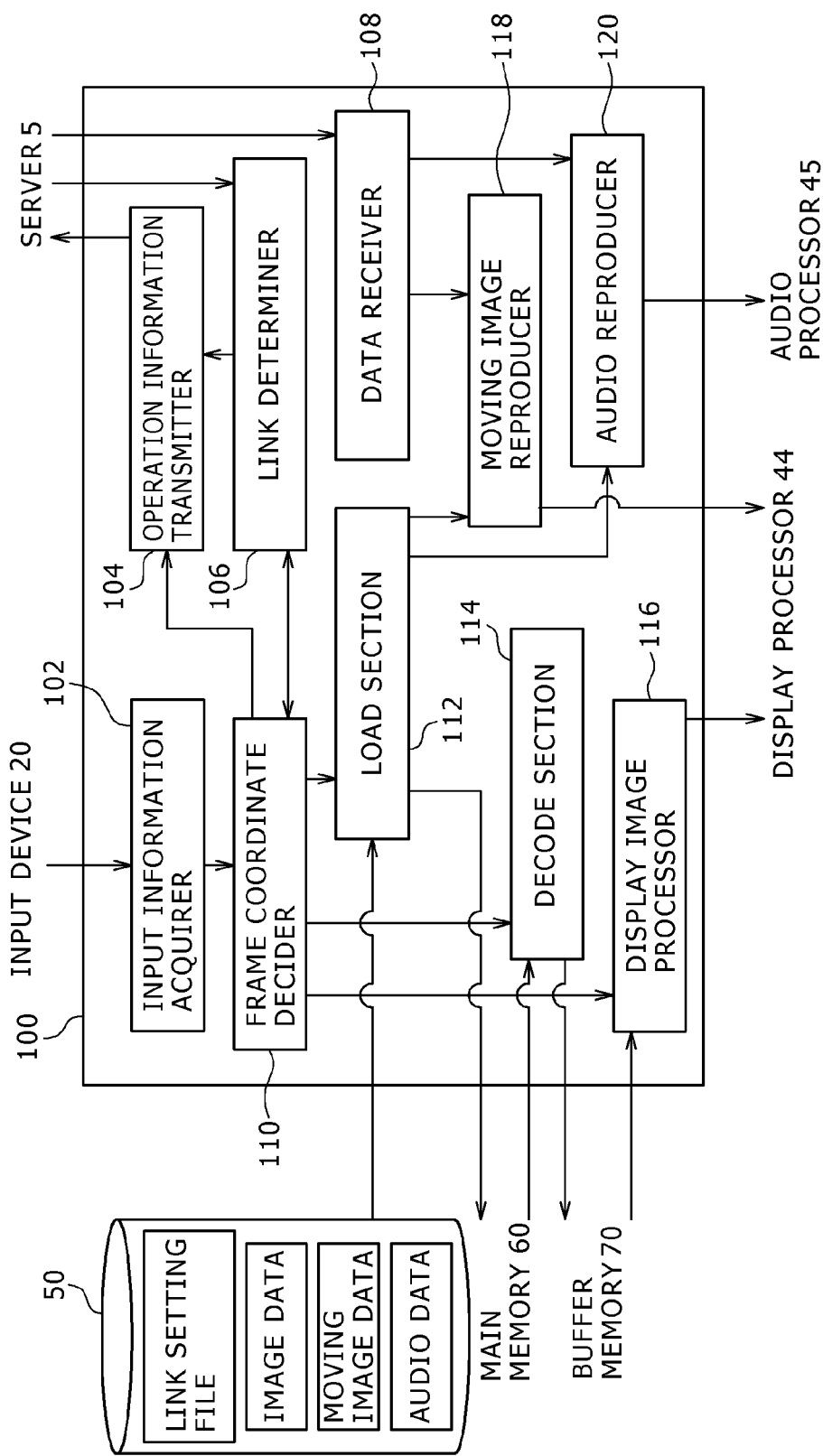
FIG. 7 is a diagram showing the configuration of a control section in the information processing device of a client terminal in the present embodiment in detail.

FIG. 7 shows the configuration of the control section 100 in the information processing device 10 of the client terminal 1 in detail. The control section 100 includes an input information acquirer 102 that acquires information input from the input device 20 by a user, a frame coordinate decider 110 that decides the frame coordinates of the frame that should be displayed next, and a load section 112 that decides the data that should be newly loaded and loads it from the hard disk drive 50. The control section 100 further includes a decode section 114 that decodes image data, a display image processor 116 that draws an image of the display area, a moving image reproducer 118 that reproduces moving image data, and an audio reproducer 120 that reproduces audio data.

The control section 100 further includes a link determiner 106 that determines the necessity of execution of a link and information transmission to the server 5, an operation information transmitter 104 that transmits operation information in the client terminal 1 to the server 5, and a data receiver 108 that receives data from the server 5. In the hard disk drive 50, image data, moving image data, audio data, and link setting files are stored. As described above, the link setting file is created for each of the image data of the link source.

Figure 8:
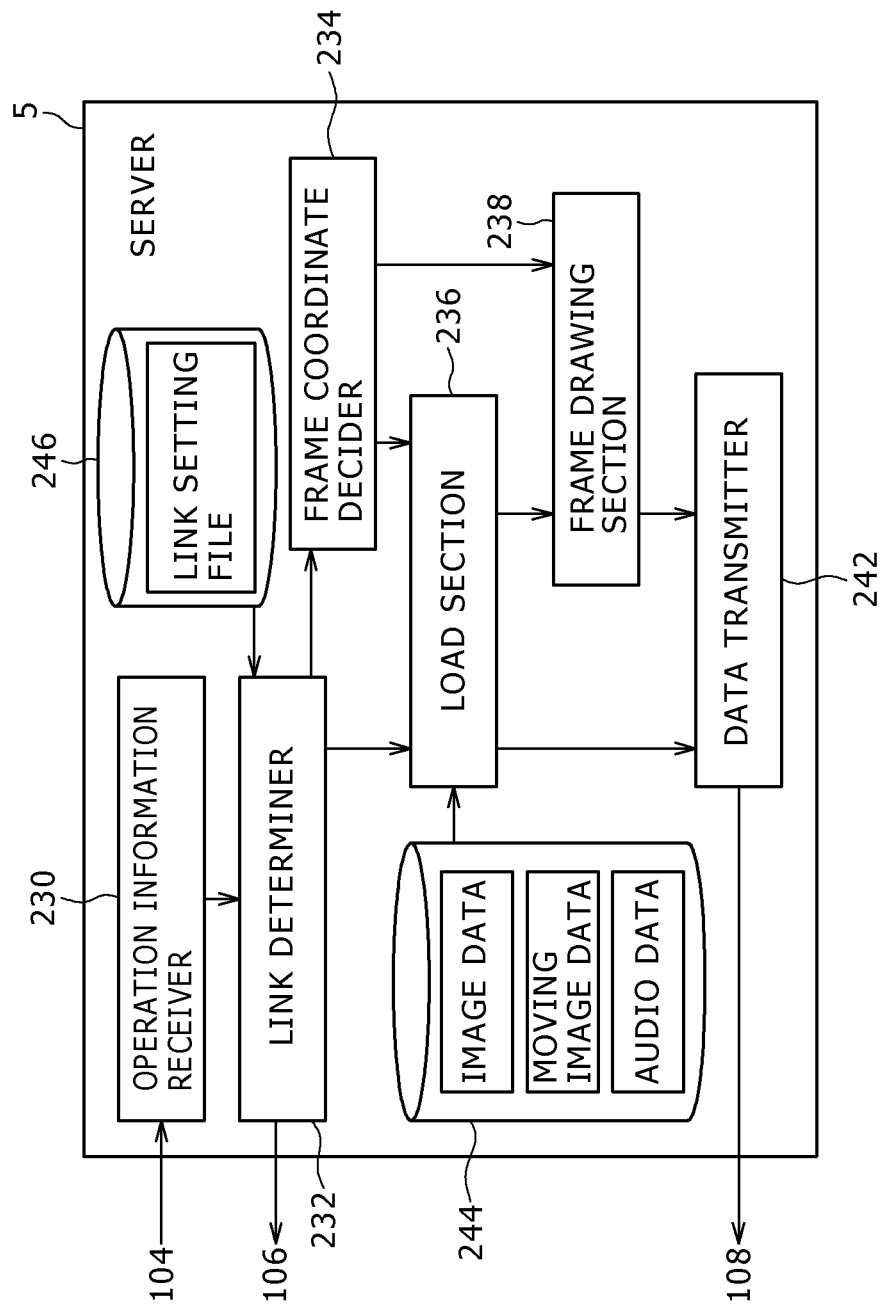
FIG. 8 is a diagram showing the configuration of functional blocks of a server in the present embodiment.

As shown in FIG. 7 and FIG. 8 to be described later, the respective elements described as functional blocks to execute various kinds of processing can be formed of CPU (Central Processing Unit), memory, and other LSIs in terms of hardware, and are realized by a program loaded to the main memory 60 and so forth in terms of software. As already described, the control section 100 has one PPU and plural SPUs and the PPU and the SPUs can form the respective functional blocks individually alone or in cooperation. Therefore, it is understood by those skilled in the art that these functional blocks can be realized in various forms by only hardware, only software, or a combination of them, and they are not limited to either one.

The input information acquirer 102 acquires the contents of an instruction, such as start/end of image display, selection of an image file, and movement of the display area, input to the input device 20 by the user. The frame coordinate decider 110 decides the frame coordinates of each time determined by the frame rate in accordance with the frame coordinates of the present display area and information on a display area movement request input by the user. Specifically, the frame coordinate decider 110 calculates a movement velocity vector from a request signal of display area movement acquired from the input device 20 and decides the frame coordinates of each time according to it. The information on these frame coordinates is first notified to the link determiner 106.

The link determiner 106 monitors whether or not the frame coordinates notified from the frame coordinate decider 110 overlap with a link area with reference to the link setting file that is loaded from the hard disk drive 50 in advance and corresponds to the image as the display target at the time. At the link destination set in the link setting file, data stored in the hard disk drive 50 and data held by the server 5 may exist in a mixed manner.

If the link destination is data stored in the hard disk drive 50, identification information of the data is set as the information relating to the data of the link destination. If the link destination is data held by the server 5, information to identify the server 5 is set and the specific identification information of the data does not need to be set. This is because the link to the data held by the server 5 is executed on the side of the server 5 substantially.

Then, when the frame overlaps with the link area whose link destination is data stored in the hard disk drive 50, the link determiner 106 determines to execute the link and returns the identification information of the data of the link destination to the frame coordinate decider 110. If the data of the link destination notified in this manner is image data, the frame coordinate decider 110 converts the frame coordinates decided previously to frame coordinates in the coordinate system of the image of the link destination. The coordinate conversion can be easily carried out because the link area in the image of the link source is associated with the link area in the image of the link destination in the link setting file.

Furthermore, the frame coordinate decider 110 notifies the identification information of the image data and the decided frame coordinates to the load section 112, the decode section 114, and the display image processor 116. If the link determiner 106 has determined to execute the link, the frame coordinate decider 110 notifies the identification information of the image data of the link destination and the frame coordinates obtained after the coordinate conversion. If the link destination is moving image data or audio data, the identification information thereof is notified to the load section 112. The determination of the type of the data of the link destination is permitted by making information thereof be included in the identification information of the data of the link destination in the link setting file. If the file name of the data is employed as the identification information, the type of the data can be determined by using a general extension.

On the other hand, when the frame enters a predetermined range of a link area whose link destination is data held by the server 5, the link determiner 106 notifies the operation information transmitter 104 of the identification information of the server 5 set as information on the link destination and the identification information of the image data used for display at the time. The operation information transmitter 104 receives the notification from the link determiner 106 and establishes communication with the server 5 to notify the identification information of the image data used for display at the time. Moreover, the operation information transmitter 104 starts acquisition of the frame coordinates from the frame coordinate decider 110 and sequentially transfers the relevant information to the server 5.

The communication with the server 5 is established to transmit the operation information in the client terminal 1 when the display area gets close to the link area to such an extent that it can be expected to enter the link area before actually overlapping with the link area. This allows the link to be smoothly executed on the side of the server 5 when the display area actually overlaps with the link area. For this purpose, an area with a predetermined size including the link area is set as a switching area. The switching area may be individually set for each link area in the link setting file or may be set as the same range for all link areas.

Furthermore, for example when the frame gets out of the switching area, the link determiner 106 acquires notification indicating this from the server 5 and notifies it to the operation information transmitter 104. In this case, the operation information transmitter 104 ends the transmission of the frame coordinates to the server 5. Alternatively, the link determiner 106 itself may determine whether or not the frame has gotten out of the switching area.

The load section 112 decides the tile images that should be loaded to the main memory 60 based on the information from the frame coordinate decider 110. Thereafter, if there are the tile images that have not yet been loaded, the load section 112 loads data of these tile images from the hard disk drive 50 to the main memory 60. The tile images that should be loaded to the main memory 60 are tile images included in the frame notified from the frame coordinate decider 110, tile images in a predetermined range around these tile images, tile images in an area that is expected to be necessary in the future from the transition of the past frame coordinates, and so forth.

In such tile images, an image of a link destination that is expected to be necessary in the future is also included. Data other than the data necessary for drawing of the immediately-subsequent display image may be constantly loaded at a predetermined time interval for example. Furthermore, based on the identification information of moving image data or the identification information of audio data notified from the frame coordinate decider 110, the load section 112 supplies the relevant file from the hard disk drive 50 to the moving image reproducer 118 or the audio reproducer 120.

Based on the information on frame coordinates acquired from the frame coordinate decider 110, the decode section 114 reads out data of tile images from the main memory 60 to decode it and store the decoded data in the buffer memory 70. At this time, the decode section 114 gives priority to and decodes the data that have not yet been stored in the buffer memory 70, of the data of the frame that should be displayed immediately subsequently, and further decodes the periphery thereof, an area that is expected to be displayed in the future, and so forth in accordance with a predetermined rule. The display image processor 116 reads out the corresponding image data from the buffer memory 70 based on the frame coordinates of the next frame acquired from the frame coordinate decider 110, and draws an image of the frame in the frame memory of the display processor 44.

The data receiver 108 receives data transmitted from the server 5 according to the movement of the display area in the client terminal 1. The data received here is data of a moving image obtained by the movement of the display area in a still image according to a display area movement request or moving image or audio data set as a link destination in advance, and is transmitted in real time by the server 5 with a low-delay codec. As above, even when the link destination is a still image such as hierarchical data, the need to transmit the hierarchical data itself is eliminated by transmitting video obtained by the movement of the display area thereof as a moving image stream in real time.

The moving image reproducer 118 reproduces moving image data loaded from the hard disk drive 50 by the load section 112 or moving image data received from the server 5 by the data receiver 108, and outputs the reproduced data to the display processor 44. The audio reproducer 120 reproduces audio data loaded from the hard disk drive 50 by the load section 112 or audio data received from the server 5 by the data receiver 108, and outputs the reproduced data to the audio processor 45.

In a period during which data is transmitted from the server 5, this data is output with priority given thereto. This switches the reading source of the output data. Due to such a configuration, irrespective of whether the reading source of the data is the hard disk drive 50 or the server 5, update of the display image triggered by a display area movement request, display of a moving image of a link destination, and audio reproduction can be realized in the same manner in appearance.

The server 5 may have a configuration similar to that of the information processing device 10 shown in FIG. 2 basically. FIG. 8 shows the configuration of functional blocks of the server 5. The server 5 includes a link setting file storage 246 in which link setting files are stored and a data storage 244 in which image data, moving image data, and audio data are stored.

The server 5 further includes an operation information receiver 230 that receives operation information from the client terminal 1, a link determiner 232 that determines the necessity of execution of a link and information reception from the client terminal 1, and a frame coordinate decider 234 that decides the frame coordinates of each frame. The server 5 further includes a load section 112 that decides the data that should be newly loaded and loads it from the data storage 244, a frame drawing section 238 that decodes image data and draws an image of the display area as the frame of a moving image, and a data transmitter 242 that transmits moving image data or audio data to the client terminal 1.

The link setting file storage 246 stores link setting files having the same structure as that of the link setting files stored in the hard disk drive 50 of the information processing device 10. Because the server 5 normally grasps information of all data, information relating to data of the link destination in the link setting file held by the server 5 is the identification information of this data. If the client terminal 1 also holds the data of the link destination, information representing this is made to be included in the information relating to the data of the link destination and thereby the reading source is switched to the hard disk drive 50 of the client terminal 1.

If this is employed, the link setting file stored by the link setting file storage 246 differs depending on what data the client terminal 1 holds. Therefore, in a mode in which the server 5 connects to the plural client terminals 1a, 1b, . . . , 1n like in the image display system 2 shown in FIG. 1, the link setting file is prepared for each client terminal.

The operation information receiver 230 establishes communication in accordance with a request from the operation information transmitter 104 of the client terminal 1 and receives the identification information of image data displayed in the client terminal 1 at the time. Furthermore, it receives frame coordinates in real time. The link determiner 232 monitors whether or not the relevant frame overlaps with a link area with reference to a link setting file stored by the link setting file storage 246.

Then, when the frame overlaps with a link area whose link destination is data not held by the client terminal 1, the link determiner 232 determines to execute a link. Furthermore, if the data of the link destination is image data, the link determiner 232 notifies the identification information thereof to the frame coordinate decider 234. On the other hand, if this data is moving image data or audio data, the link determiner 232 notifies the identification information of this data to the load section 236.

Moreover, when the frame gets out of a switching area that has triggered transmission of frame coordinates from the client terminal 1 or when the frame enters a link area whose link destination is data held by the client terminal 1, the link determiner 232 notifies this to the link determiner 106 of the client terminal 1.

When the link determiner 232 has determined to execute a link, the frame coordinate decider 234 converts frame coordinates received from the operation information receiver 230 to frame coordinates in the coordinate system of the image of a link destination notified from the link determiner 232. The frame coordinate decider 234 notifies the identification information of the image data of the link destination and the frame coordinates obtained after the coordinate conversion to the load section 236 and the frame drawing section 238. The load section 236 loads the necessary data from the data storage 244 to a memory not shown in the diagram based on the information from the frame coordinate decider 234.

The frame drawing section 238 reads out data from the memory and decodes it based on the frame coordinates to store the decoded data in a buffer memory not shown in the diagram and draw an image of the frame. The operation of the load section 236 and the frame drawing section 238 may be the same as the operation of the load section 112, the decode section 114, and the display image processor 116 in the information processing device 10, described above. However, the frame drawing section 238 performs compression coding of moving image data whose frame is the drawn image in a predetermined format and then sequentially supplies the coded data to the data transmitter 242.

Furthermore, based on the identification information of moving image data of the link destination notified from the link determiner 232 or the identification information of audio data, the load section 236 loads the relevant data from the data storage 244 and sequentially supplies it to the data transmitter 242. The data transmitter 242 sequentially transmits the moving image data or audio data supplied from the load section 236 or the frame drawing section 238 to the data receiver 108 of the client terminal 1.

FIGS. 9 and 10 show data structure examples of link setting files. A link setting file 22a shown in FIG. 9 is stored in the hard disk drive 50 of the client terminal 1 and a link setting file 22b shown in FIG. 10 is stored in the link setting file storage 246 of the server 5, and they are associated with the same image data. In the link setting files 22a and 22b, a description on one row corresponds to one link. They are formed of four kinds of fields, i.e. a link source image frame field 302, an effective scale range field 304, a link destination file field 306, and a link destination image frame field 308.

As described above, the client terminal 1 and the server 5 hold similar link setting files. This allows the server 5 to trace motion relating to display in the client terminal 1. Therefore, in the link setting file 22a of FIG. 9 and the link setting file 22b of FIG. 10, the link source image frame field 302, the effective scale range field 304, and the link destination image frame field 308 each have the same setting. On the other hand, as described above, the formats of information relating to link destination data in the link destination file field 306 are different from each other.

The link source image frame field 302 sets, by predetermined frame parameters, an area that causes switching to another image data in the image being displayed, i.e. a link area. This area is equivalent to e.g. the link area 163 in the link of the arrow B in FIG. 4. In this example, the frame parameters are represented by the values of the following four parameters when a rectangle that has the same center as that of the image of the display target, is circumscribed to this image and has a predetermined value as its aspect ratio is employed as a reference frame: the ratio of the amount of horizontal offset from this reference frame; the ratio of the amount of vertical offset; the scaling-up rate; and the rotation angle. However, the setting method of the link area is not limited thereto and e.g. coordinates of four corners in the three-dimensional space shown in FIG. 5 may be employed.

The effective scale range field 304 specifies the width of the scaling-up rate with which the link is effective, with the scaling-up rate in the link source image frame field 302 regarded as the start point. On the first row in the link setting files 22a and 22b, the scaling-up rate of the link area shown in the link source image frame field 302 is "2.0" and the value of the effective scale range field 304 is "98.0." Therefore, such setting is obtained that the link is set effective and image data is switched when the frame has a scaling-up rate of 2.0 to 100.0.

For example, in the link of the arrow B in FIG. 4, switching to the image 156 is made when the frame overlaps with the link area 163 as a result of zoom-out of the image, i.e. scaling-up of the frame from a frame smaller than the link area 163 of the image 158. Therefore, to set the link effective when the scaling-up rate of the frame is equal to or higher than "2.0," which is the scaling-up rate of the link area 163, the value of the effective scale range field 304 is set to a positive value. Due to this, the link can be set effective even when the display area is moved to a range including the link area 163 after the scaling-up rate is sufficiently raised in display of the image 158.

Meanwhile, in the link of the arrow A in FIG. 4, switching to the image 158 is made when the frame overlaps with the link area 162 as a result of zoom-in of the display image, i.e. scaling-down of the frame from a frame larger than the link area 162 of the image 156. Therefore, like on the second row in the link setting files 22a and 22b, the effective scale range field 304 is set to a negative value such as "−1.0." The link destination file field 306 sets information relating to data of the link destination. For example, if the data of the link destination is held on the side of the client terminal 1, the file name of this data is set in the link setting file 22a held on the side of the client terminal 1.

On the first row and the second row in the link setting file 22a, hierarchical data with names of "parent_0" and "child_0" are set. Therefore, when the relevant link is executed, an image of these hierarchical data is displayed in accordance with a display area movement request of the user by cooperation of the frame coordinate decider 110, the load section 112, the decode section 114, and the display image processor 116 of the information processing device 10.

Furthermore, on the third row, the data of the link destination is set to "AAA.mp4." From this extension, it turns out that the data of the link destination is moving image data compressed in the MPEG-4 format. Thus, in link execution, the load section 112 of the information processing device 10 supplies moving image data with a file name of "child.mp4" from the hard disk drive 50 to the moving image reproducer 118. Thereby, the relevant moving image is reproduced. This applies also to audio data.

On the other hand, if the data of the link destination is not held on the side of the client terminal 1, the address of the server 5 or the like is set in the link destination file field 306. On the fourth row in the link setting file 22a, the link destination is set to "/server1/aaa/." Specifically, this means that output data needs to be acquired from a server represented by "/server1/aaa/" because the data of the link destination in this link is not stored in the hard disk drive 50 of the client terminal 1.

For such a link, the client terminal 1 establishes communication with the server 5 set with "/server1/aaa/" at the timing when the frame enters the above-described switching area, to sequentially transmit frame coordinates. Meanwhile, if the data of the link destination is not held on the side of the client terminal 1, the file name of this data is set in the link destination file field 306 in the link setting file 22b held on the side of the server 5.

Specifically, if frame coordinates are transmitted as described above at the timing when the frame enters the switching area for the link of the fourth row in the link setting file 22a in FIG. 9, the server 5 refers to the link setting file 22b in FIG. 10 and determines whether or not to execute the link of the same fourth row. In the link setting file 22b held by the server 5, moving image data with a name of "BBB.mp4" is set as the link destination. Therefore, this moving image data can be transmitted to the side of the client terminal 1 at the time of link execution.

On the other hand, if the side of the client terminal 1 holds the data of the link destination, information indicating that the client terminal 1 holds this data is added to the link destination file field 306 in addition to the file name of the data of the link destination. In the link setting file 22b of FIG. 10, regarding the links of the first to third rows, characters of "/client1/" are added before the respective file names and thereby that the relevant data are held by the client terminal 1 is shown. This character information may be the address of the client terminal 1 or the like.

If frame coordinates get out of the switching area of the link of the fourth row or if frame coordinates enter the link area of the first to third row or the switching area of the corresponding link, the link determiner 106 of the server 5 that has been receiving frame coordinates because the frame had entered the switching area of the link of the fourth row like in the above-described example notifies this to the link determiner 106 of the client terminal 1. Thereby, the transmission of the frame coordinates from the client terminal 1 is stopped.

As shown in FIGS. 9 and 10, the setting contents of the link setting file change depending on whether or not the data of the link destination is held by the client terminal 1. Therefore, for example when the user who operates the client terminal 1 purchases data and formally downloads it from the server 5, both of the link setting files 22a and 22b are rewritten. At this time, the client terminal 1 and the server 5 rewrite their own link setting files when detecting the download.

The link destination image frame field 308 specifies the data after switching, i.e. the frame of a link area in the image of the link destination, by frame parameters for this image. As described above, the link setting files 22a and 22b are created for each of image data of the link source. Specifically, information on the links of the arrows A and C in FIG. 4 is described in the link setting file corresponding to data of the image 156, and the link information of the arrow B is described in the link setting file corresponding to data of the image 158. By employing this, even when links are bidirectionally set, the behavior thereof can be set independent. For example, it is also possible to make areas different between the link areas 162 and 163 in the transition of the arrow A and the link areas 163 and 162 in the transition of the arrow B in FIG. 4.

Figure 11:
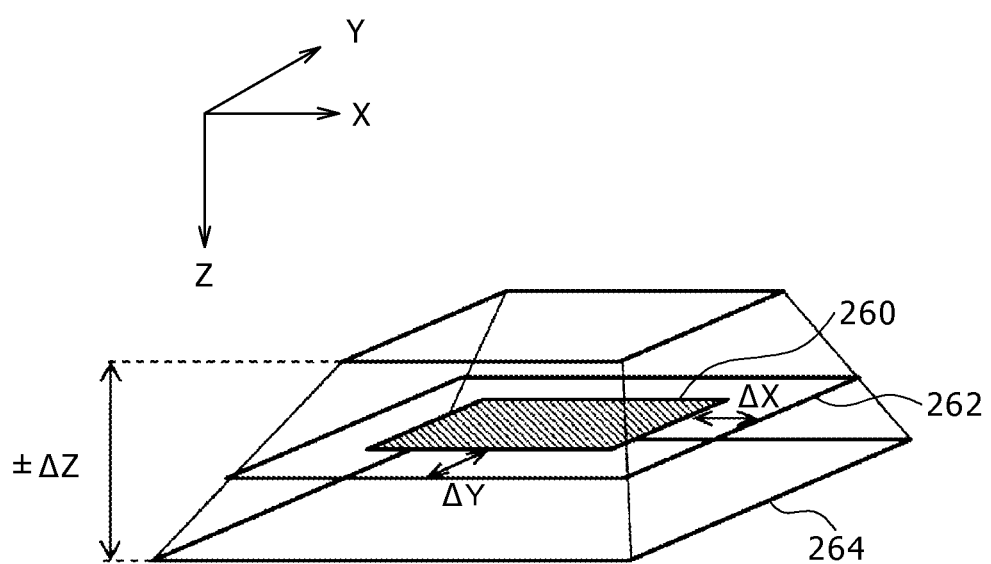
FIG. 11 is a diagram schematically showing an example of a switching area set for a link area in the present embodiment.

FIG. 11 schematically shows an example of the switching area set for the link area. This diagram represents part of a link area 260 set for hierarchical data forming a three-dimensional space like that shown in FIG. 5. For this link area 260, first on the image plane (XY plane) of the same resolution, an area 262 including the link area 260 and a range of a predetermined width (ΔX, ΔY) around it is decided. Moreover, images obtained by changing the image of this area 262 in the resolution direction (Z-axis direction) to predetermined extents (±ΔZ) are defined as the upper limit/lower limit in the resolution direction.

The three-dimensional area formed in this manner is employed as a switching area 264 of the link area 260. As shown in FIGS. 9 and 10, also when a link area itself has a width in the resolution direction, similarly a switching area can be set by further changing the resolution from the upper limit and lower limit of the resolution to predetermined extents (±ΔZ).

Figure 12:
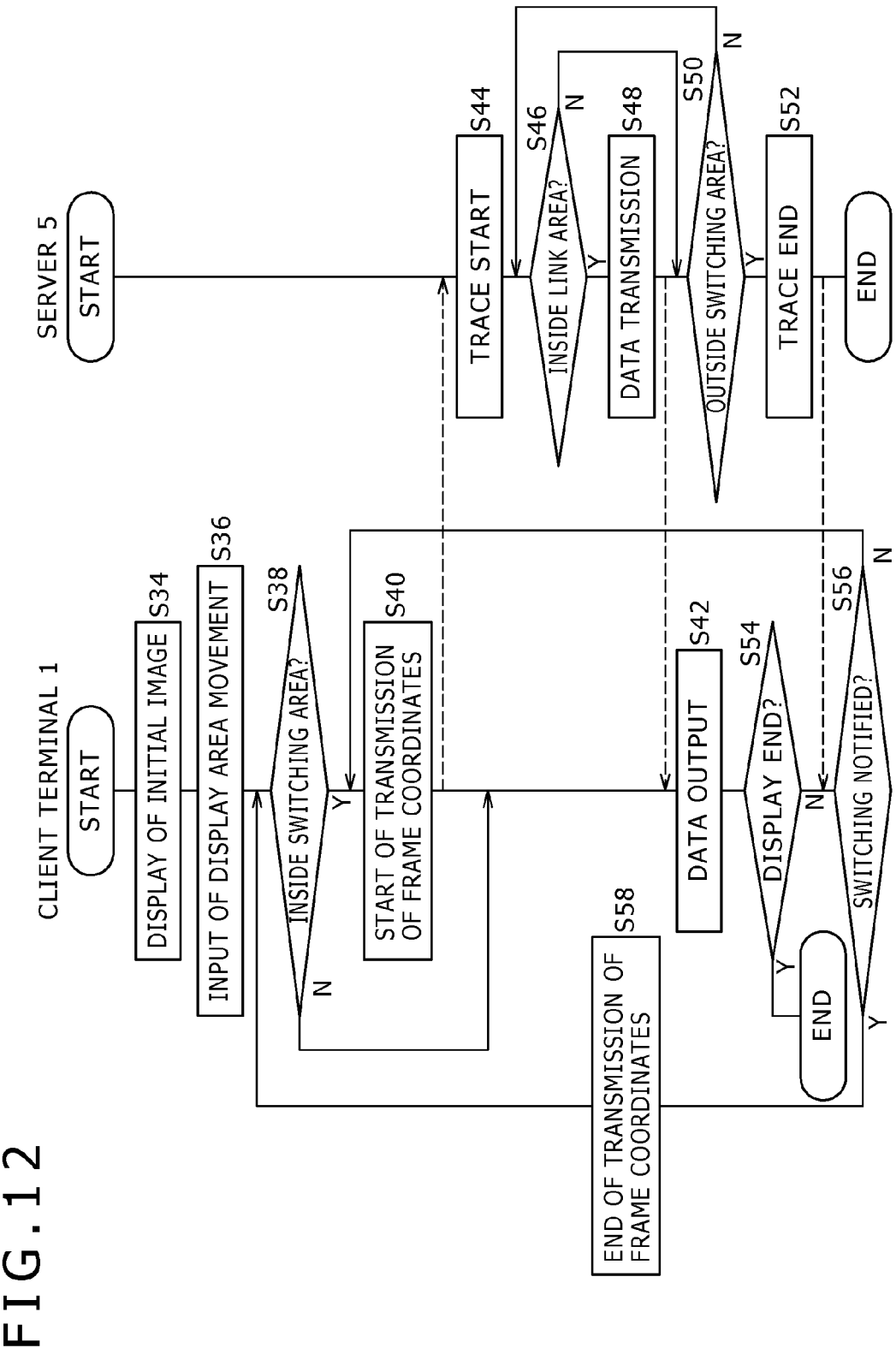
FIG. 12 is a flowchart showing a processing procedure to perform image display in the client terminal by the image display system in the present embodiment.

Next, the operation of the data supply system realized by the configuration described thus far will be explained. FIG. 12 is a flowchart showing a processing procedure to perform image display in a client terminal by the image display system. In this flowchart, processing continuously executed is also represented by one rectangle in some cases for convenience. First, the user carries out selection of an initial image and so forth and orders start of image display with the client terminal 1. Thereupon, the initial image is displayed by cooperation of the load section 112, the decode section 114, the display image processor 116, and so forth in the information processing device 10 of the client terminal 1 (S34).

When the user inputs a request of display area movement in this state (S36), the link determiner 106 determines whether or not the frame enters a switching area of a link whose link-destination data is not held on the side of the client terminal 1, among links set in link setting files (S38). If frame coordinates do not fall within a switching area (N of S38), a new display image is output by displaying a display area defined by these frame coordinates by cooperation of the load section 112, the decode section 114, the display image processor 116, and so forth (S42).

At this time, if the frame has entered a link area of a link whose link-destination data is held on the side of the client terminal 1, switching to image data of this link destination is made. If the data of the link destination is moving image data or audio data, this data is reproduced. If the frame coordinates fall within a switching area (Y of S38), the operation information transmitter 104 establishes communication with the server 5 to transmit the identification information of the image data being displayed at the time and then start transmission of frame coordinates (S40).

Based on the information transmitted from the operation information transmitter 104, the server 5 starts tracing of the display area in the client terminal 1 (S44). At this time, the load section 236 and the frame drawing section 238 may operate similarly to the load section 112, the decode section 114, and the display image processor 116 of the client terminal 1 to thereby draw the actual display area. Simultaneously, the link determiner 232 refers to the link setting file associated with the image data being displayed in the client terminal 1, and monitors whether or not the frame enters a link area whose link destination is data not held by the client terminal 1 and whether or not the frame exists inside a switching area (S46, S50).

If the frame does not enter the relevant link area and does not get out of the switching area (N of S46, N of S50), this state is kept. During this, the client terminal 1 continues to output a new display image in response to display area movement requests while transmitting new frame coordinates to the server 5 (N of S54, N of S56, S40, S42). In the server 5, if the link determiner 232 detects that the frame has entered a link area whose link destination is data not held by the client terminal 1 (Y of S46), the data transmitter 242 transmits the data of the link destination to the client terminal 1 (S48).

The data to be transmitted is a moving image obtained by the movement of the display area on the image of the link destination, either of a moving image and audio specified as the link destination, or a combination thereof as described above. From the timing of the arrival of the data transmitted from the server 5, the client terminal 1 gives priority to reproduction of this data and outputs it (S42). During this, the server 5 continues to transmit the movement image of the display area according to the movement of frame coordinates, moving image data, or audio data as a stream. The client terminal 1 stops the drawing processing of the display area and continues the transmission of frame coordinates to the server 5 (N of S54, N of S56, S40).

The frame coordinates transmitted by the client terminal 1 at this time may remain ones for the image displayed at the timing when frame coordinates are transmitted by the processing of S40 at first. The server 5 converts these frame coordinates to frame coordinates on the image of the link destination. This eliminates the need for the client terminal 1 to recognize what image the link destination is. Alternatively, instead of the frame coordinates, a request signal of display area movement acquired by the input information acquirer 102 may be transferred as it is.

If the frame gets out of the link area whose link destination is data not held by the client terminal 1, the server 5 stops the data transmission (N of S46). However, the link determiner 232 continues monitoring during a period when this frame exists inside the switching area (N of S50). The processing sequence proceeds to the same processing procedure as that of the case of N of S46 also when a moving image or audio of the link destination is reproduced to the last or when a link to data held by the client terminal 1 is further executed for example. However, if the link to the data held by the client terminal 1 is one whose link destination is an image or area different from the image originally displayed, the identification information of the relevant image data or information relating to the area is transmitted to the client terminal 1.

If the data transmission from the server stops or a notification of a link to another image data or area is made, the client terminal 1 makes switching to data output by use of its own held data. If the frame gets out of the switching area (Y of S50), the link determiner 232 of the server 5 notifies this to the client terminal 1 and then ends the tracing of the display area (S52).

When receiving this notification (Y of S56), the client terminal 1 ends the transmission of frame coordinates to the server 5 (S58) and monitors whether or not the frame enters a switching area again (S38). By repetition of the above-described processing, similar output is made in the client terminal 1 irrespective of where the data is read out from. Meanwhile, due to transmission of only data not held by the client terminal 1 from the server 5 in a stream format, distinction of data is clearly made inside the system.

In a conventional technique such as a map display system in which image data is transmitted from a network server to be displayed by a client terminal, both of network transmission of the image data and a caching mechanism in the client terminal are utilized and display is updated at the timing when the data of the display area is completed. In such a form, responsiveness until display is determined depending on the band of the transmission channel, the performance of the cache mechanism, and so forth across the board irrespective of the intension of the user.

Furthermore, due to the caching by the client terminal, distinction from data that is originally possessed by the user and is stored in a hard disk drive or the like is ambiguous. Therefore, even when charging the user for the provision of image data is attempted, it is difficult to set the boundary for it.

In the present embodiment, the reading source of data can be seamlessly switched without change in operability in the client terminal 1. On the other hand, distinction of data is made depending on whether or not the data is held by the client terminal 1 and thus quality and charging management thereof can be easily carried out for each data. For example, in the case of transmitting image data not held by the client terminal 1 from the server 5, a trailer, an excerpt, or an image with lower time resolution and spatial resolution, of an original moving image or still image, is employed and only reproduction and output are performed in the client terminal 1. If the user who has viewed it decides to purchase it, data of the original moving image or still image is downloaded to the hard disk drive 50 through charging processing.

If this is employed, data formally purchased is data that has little dependence on the band of the transmission channel, the performance of the cache mechanism, and so forth and has ensured quality and responsiveness, and data before the purchase is data whose contents and quality are controlled and whose responsiveness depends on the environments. As a result, the user can decide to purchase data after modestly checking the data before the purchase and is allowed to view it by the same operation irrespective of the purchase. Furthermore, even with a terminal having poor resources, the user can trace a data network hugely extending by the link mechanism and enjoy various pieces of content.

The present invention is explained above based on the embodiment. The above-described embodiment is exemplification and it will be understood by those skilled in the art that various modification examples can be made in the combinations of the respective constituent elements and the respective processing processes thereof and these modification examples are also within the scope of the present invention.

For example, in the embodiment, either one of the client terminal 1 and the server 5 makes determination as to link execution and notifies the result thereof to the counterpart to thereby entrust the subsequent link execution processing to the counterpart. However, the notification to the counterpart device may be omitted by always making determination as to link execution in both devices. In this case, e.g. a mode can also be realized in which data is transmitted from the server 5 in advance at e.g. the timing when the display area enters a switching area and the output is switched to the data transmitted from the server when determination as to link execution is made on the side of the client terminal 1.

Furthermore, in the embodiment, the server 5 traces the display area in the client terminal 1 only when the frame exists in a switching area. However, the server 5 may always trace the display area irrespective of the position of the frame. In this case, the server 5 may transmit data to the client terminal 1 only when a link to data not held by the client terminal 1 is executed, or may continue to transmit all data irrespective of whether or not the client terminal 1 holds the data. In the latter case, the reading source of data may be switched on the side of the client terminal 1 depending on whether or not the client terminal 1 itself holds the data.

REFERENCE SIGNS LIST

1 Client terminal, 2 Image display system, 5 Server, 10 Information processing device, 12 Display device, 20 Input device, 22a Link setting file, 22b Link setting file, 38 Tile image, 50 Hard disk drive, 60 Main memory, 70 Buffer memory, 100 Control section, 102 Input information acquirer, 104 Operation information transmitter, 106 Link determiner, 108 Data receiver, 110 Frame coordinate decider, 112 Load section, 114 Decode section, 116 Display image processor, 118 Moving image reproducer, 120 Audio reproducer, 230 Operation information receiver, 232 Link determiner, 234 Frame coordinate decider, 236 Load section, 238 Frame drawing section, 242 Data transmitter, 244 Data storage, 246 Link setting file storage.

INDUSTRIAL APPLICABILITY

As described above, the present invention can be applied to information processing device and information processing system such as computer, game device, image display device, and content providing server.

The invention claimed is:

1. An image display system comprising:
a client terminal including:
a first storage that stores one or more portions of overall image data,
an area parameter decider that decides respective area parameters representing respective positions and sizes of respective display areas of the overall image data for display on the client terminal according to respective request signals of display area movements made by a user of the client terminal,
a display image processor that draws images of the display areas by using image data that are defined by the area parameter and outputs the images to a display device,
a first link determiner that determines whether one or more of the respective request signals result in the respective display areas to at least partially fall within a switching area within which a link area is located, where the link area defines an area within a source portion among the one or more portions of the overall image data that is linked to another area within a destination portion of the overall image data that is not among the one or more portions of overall image data stored in the first storage of the client terminal,
an operation information transmitter that sequentially transmits information, relating to the respective positions and sizes of the respective display areas that at least partially fall within the switching area, to a server, and
a data receiver that receives the destination portion of the overall image data from the server for storage in the first storage; and
the server including:
a second storage that stores at least all portions of the overall image data that are not stored in the first storage of the client terminal,
a second link determiner that receives the respective positions and sizes of the respective display areas received from the client terminal and that also determines whether one or more of the respective request signals result in the respective display areas to at least partially fall within the switching area within which the link area is located, and
a data transmitter that transmits the destination portion of the overall image data to the client terminal.

2. The image display system according to claim 1, wherein
the first storage and the second storage store, in association with the image data, a link setting file in which information relating to the link area for switching display to a different image when the display area arrives at the link area while an image is being displayed and an image after switching is set,
if data of the image after switching set in the link setting file associated with data of the image being displayed is stored in the first storage, the display image processor of the client terminal draws an image of the display area after switching by using the data of the image and outputs the image to the display device, and
if the data of the image after switching is not stored in the first storage, the data transmitter of the server converts the area parameter to an area parameter in the image after switching and transmits the data of the image of the display area in the image.

3. The image display system according to claim 2, wherein
the operation information transmitter of the client terminal starts transmission of the area parameter when the display area arrives at a switching area of a predetermined range including the link area that is set in the link setting file and whose data of the image after switching is not stored in the first storage, the second link determiner detects arrival of the display area defined by the area parameter at the link area whose data of the image after switching is not stored in the first storage, and the data transmitter transmits the data of the image to the client terminal when the second link determiner detects arrival of the display area at the link area.

4. The image display system according to claim 3, wherein image data stored in the first storage has a hierarchical structure made by hierarchizing a plurality of image data representing one image with different resolutions in resolution order, and setting of the link area in the link setting file includes setting of resolution and resolution in a predetermined range including resolution of the link area is included in the switching area.

5. The image display system according to claim 3, wherein the second link determiner of the server further detects arrival of the display area at the link area whose data of the image after switching is stored in the first storage, the data transmitter stops transmission of data when the second link determiner detects arrival of the display area at the link area in a situation in which the data transmitter is transmitting the data of the image of the display area to the client terminal, and when data transmission from the data transmitter stops, the display image processor of the client terminal draws an image of the display area by using the data of the image after switching stored in the first storage and outputs the image to the display device.

6. The image display system according to claim 2, wherein the data of the image after switching set in the link setting file includes moving image data.

7. The image display system according to claim 1, wherein the operation information transmitter of the client terminal starts transmission of the information relating to movement of the display area when the display area defined by the area parameter arrives at a predetermined range including an area requiring image data that is not stored in the first storage, and the data transmitter of the server transmits the data of the image to the client terminal when the display area exists in the area requiring image data that is not stored in the first storage.

8. The image display system according to claim 7, wherein the first storage of the client terminal stores server information in which an area requiring image data that is not stored in the first storage is associated with identification information of a server capable of transmitting data of an image of the display area drawn by using the image data that is not stored in the first storage, and the operation information transmitter transmits the information relating to movement of the display area to a server whose identification information is described in the server information.

9. An information processing device, comprising:

a first storage that stores one or more portions of overall image data;

an area parameter decider that decides respective area parameters representing respective positions and sizes of respective display areas of the overall image data for display on the client terminal according to respective request signals of display area movements made by a user of the client terminal;

a display image processor that draws images of the display areas by using image data that are defined by the area parameter and outputs the images to a display device;

a first link determiner that determines whether one or more of the respective request signals result in the respective display areas to at least partially fall within a switching area within which a link area is located, where the link area defines an area within a source portion among the one or more portions of the overall image data that is linked to another area within a destination portion of the overall image data that is not among the one or more portions of overall image data stored in the first storage of the client terminal;

an operation information transmitter that sequentially transmits information, relating to the respective positions and sizes of the respective display areas that at least partially fall within the switching area, to a server connected via a network; and a data receiver that receives the destination portion of the overall image data from the server for storage in the first storage, wherein the server includes:

a second storage that stores at least all portions of the overall image data that are not stored in the first storage of the client terminal, a second link determiner that receives the respective positions and sizes of the respective display areas received from the client terminal and that also determines whether one or more of the respective request signals result in the respective display areas to at least partially fall within the switching area within which the link area is located, and a data transmitter that transmits the destination portion of the overall image data to the client terminal.

10. A server in communication with a client terminal via a network, the client terminal including: (i) a first storage that stores one or more portions of overall image data, (ii) an area parameter decider that decides respective area parameters representing respective positions and sizes of respective display areas of the overall image data for display on the client terminal according to respective request signals of display area movements made by a user of the client terminal, (iii) a display image processor that draws images of the display areas by using image data that are defined by the area parameter and outputs the images to a display device, (iv) a first link determiner that determines whether one or more of the respective request signals result in the respective display areas to at least partially fall within a switching area within which a link area is located, where the link area defines an area within a source portion among the one or more portions of the overall image data that is linked to another area within a destination portion of the overall image data that is not among the one or more portions of overall image data stored in the first storage of the client terminal, (v) an operation information transmitter that sequentially transmits information, relating to the respective positions and sizes of the respective display areas that at least partially fall within the switching area, to a server, and (vi) a data receiver that receives the destination portion of the overall image data from the server for storage in the first storage, the server comprising:

a second storage that stores at least all portions of an overall image data that are not stored in the first storage device of the client terminal;

a second link determiner that receives the respective positions and sizes of the respective display areas received from the client terminal and that also determines whether one or more of the respective request signals result in the respective display areas to at least partially fall within the switching area within which the link area is located, and a data transmitter that transmits the destination portion of the overall image data to the client terminal.

11. An image processing method, comprising:

storing one or more portions of overall image data on a first storage of a client terminal;

deciding respective area parameters representing respective positions and sizes of respective display areas of the overall image data for display on the client terminal according to respective request signals of display area movements made by a user of the client terminal;

drawing images of the display areas by using image data that are defined by the area parameter and outputting the images to a display device of the client terminal;

determining, using a first link determiner of the client terminal, whether one or more of the respective request signals result in the respective display areas to at least partially fall within a switching area within which a link area is located, where the link area defines an area within a source portion among the one or more portions of the overall image data that is linked to another area within a destination portion of the overall image data that is not among the one or more portions of overall image data stored in the first storage of the client terminal;

sequentially transmitting information, relating to the respective positions and sizes of the respective display areas that at least partially fall within the switching area, from the client terminal to a server;

receiving the destination portion of the overall image data at the client terminal from the server for storage in the first storage;

storing at least all portions of the overall image data that are not stored in the first storage of the client terminal on a second storage of the server;

receiving, using a second link determiner of the server, the respective positions and sizes of the respective display areas received from the client terminal and determining whether one or more of the respective request signals result in the respective display areas to at least partially fall within the switching area within which the link area is located; and transmitting the destination portion of the overall image data from the server to the client terminal.

12. A method, comprising:

storing one or more portions of overall image data on a first storage of a client terminal;

deciding respective area parameters representing respective positions and sizes of respective display areas of the overall image data for display on the client terminal according to respective request signals of display area movements made by a user of the client terminal;

drawing images of the display areas by using image data that are defined by the area parameter and outputting the images to a display device of the client terminal;

determining, using a first link determiner of the client terminal, whether one or more of the respective request signals result in the respective display areas to at least partially fall within a switching area within which a link area is located, where the link area defines an area within a source portion among the one or more portions of the overall image data that is linked to another area within a destination portion of the overall image data that is not among the one or more portions of overall image data stored in the first storage of the client terminal;

sequentially transmitting information, relating to the respective positions and sizes of the respective display areas that at least partially fall within the switching area, from the client terminal to a server;

receiving the destination portion of the overall image data at the client terminal from the server for storage in the first storage, wherein the server includes:

a second storage that stores at least all portions of the overall image data that are not stored in the first storage of the client terminal, a second link determiner that receives the respective positions and sizes of the respective display areas received from the client terminal and that also determines whether one or more of the respective request signals result in the respective display areas to at least partially fall within the switching area within which the link area is located, and a data transmitter that transmits the destination portion of the overall image data to the client terminal.

13. A method of image processing on a server in communication with a client terminal, the client terminal including: (i) a first storage that stores one or more portions of overall image data, (ii) an area parameter decider that decides respective area parameters representing respective positions and sizes of respective display areas of the overall image data for display on the client terminal according to respective request signals of display area movements made by a user of the client terminal, (iii) a display image processor that draws images of the display areas by using image data that are defined by the area parameter and outputs the images to a display device, (iv) a first link determiner that determines whether one or more of the respective request signals result in the respective display areas to at least partially fall within a switching area within which a link area is located, where the link area defines an area within a source portion among the one or more portions of the overall image data that is linked to another area within a destination portion of the overall image data that is not among the one or more portions of overall image data stored in the first storage of the client terminal, (v) an operation information transmitter that sequentially transmits information, relating to the respective positions and sizes of the respective display areas that at least partially fall within the switching area, to a server, and (vi) a data receiver that receives the destination portion of the overall image data from the server for storage in the first storage, the method comprising:

storing at least all portions of the overall image data that are not stored in the first storage of the client terminal on a second storage of the server;

receiving, using a second link determiner of the server, the respective positions and sizes of the respective display areas received from the client terminal and determining whether one or more of the respective request signals result in the respective display areas to at least partially fall within the switching area within which the link area is located; and transmitting the destination portion of the overall image data from the server to the client terminal.

14. One or more non-transitory, computer readable storage media containing one or more programs, which when executed on a client terminal computer and a server computer terminal, cause the computers to carry out actions, comprising:
- storing one or more portions of overall image data on a first storage of a client terminal;
- deciding respective area parameters representing respective positions and sizes of respective display areas of the overall image data for display on the client terminal according to respective request signals of display area movements made by a user of the client terminal;
- drawing images of the display areas by using image data that are defined by the area parameter and outputting the images to a display device of the client terminal;
- determining, using a first link determiner of the client terminal, whether one or more of the respective request signals result in the respective display areas to at least partially fall within a switching area within which a link area is located, where the link area defines an area within a source portion among the one or more portions of the overall image data that is linked to another area within a destination portion of the overall image data that is not among the one or more portions of overall image data stored in the first storage of the client terminal;
- sequentially transmitting information, relating to the respective positions and sizes of the respective display areas that at least partially fall within the switching area, from the client terminal to a server;
- receiving the destination portion of the overall image data at the client terminal from the server for storage in the first storage;
- storing at least all portions of the overall image data that are not stored in the first storage of the client terminal on a second storage of the server;
- receiving, using a second link determiner of the server, the respective positions and sizes of the respective display areas received from the client terminal and determining whether one or more of the respective request signals result in the respective display areas to at least partially fall within the switching area within which the link area is located; and
- transmitting the destination portion of the overall image data from the server to the client terminal.

15. A non transitory, computer readable recording medium containing a program, which when executed on a server computer, which is in communication with a client terminal computer via a network, causes the server computer to carry out actions, wherein the client terminal including: (i) a first storage that stores one or more portions of overall image data, (ii) an area parameter decider that decides respective area parameters representing respective positions and sizes of respective display areas of the overall image data for display on the client terminal according to respective request signals of display area movements made by a user of the client terminal, (iii) a display image processor that draws images of the display areas by using image data that are defined by the area parameter and outputs the images to a display device, (iv) a first link determiner that determines whether one or more of the respective request signals result in the respective display areas to at least partially fall within a switching area within which a link area is located, where the link area defines an area within a source portion among the one or more portions of the overall image data that is linked to another area within a destination portion of the overall image data that is not among the one or more portions of overall image data stored in the first storage of the client terminal, (v) an operation information transmitter that sequentially transmits information, relating to the respective positions and sizes of the respective display areas that at least partially fall within the switching area, to a server, and (vi) a data receiver that receives the destination portion of the overall image data from the server for storage in the first storage, the actions comprising:
- storing at least all portions of the overall image data that are not stored in the first storage of the client terminal on a second storage of the server;
- receiving, using a second link determiner of the server, the respective positions and sizes of the respective display areas received from the client terminal and determining whether one or more of the respective request signals result in the respective display areas to at least partially fall within the switching area within which the link area is located; and
- transmitting the destination portion of the overall image data from the server to the client terminal.

* * * * *